United States Patent [19]

Petersen et al.

[11] 4,276,209

[45] Jun. 30, 1981

[54] CO-CONDENSATES BASED ON PHENOL-BUTYRALDEHYDE RESINS, THEIR PREPARATION AND THEIR USE

[75] Inventors: Harro Petersen, Frankenthal; Hans-Joachim Krause; Kurt Fischer, both of Ludwigshafen; Adolph Segnitz, Bad Durkheim; Horst Zaunbrecher, Worms, all of Fed. Rep. of Germany

[73] Assignee: BASF Aktiengesellschaft, Fed. Rep. of Germany

[21] Appl. No.: 87,577

[22] Filed: Oct. 23, 1979

[30] Foreign Application Priority Data

Oct. 28, 1978 [DE] Fed. Rep. of Germany ....... 2847030

[51] Int. Cl.$^3$ .................... C08L 91/06; C08L 61/08
[52] U.S. Cl. .................. 260/28 P; 156/335; 260/29.3; 260/29.6 NR; 428/378; 428/460; 428/527; 428/529; 525/58; 525/143; 525/144; 525/428; 525/429; 525/442; 525/497; 525/498; 525/934
[58] Field of Search ............. 525/143, 429, 442, 498, 525/58, 934; 428/436, 378; 427/195; 260/29.3, 28 P

[56] References Cited

U.S. PATENT DOCUMENTS

| | | |
|---|---|---|
| 2,902,458 | 9/1959 | Teppema ........................... 260/29.3 |
| 3,433,701 | 3/1969 | Armour ............................. 525/143 |
| 3,600,353 | 8/1971 | Baker ................................ 525/143 |
| 3,941,904 | 3/1976 | Hoh et al. ......................... 525/442 |
| 4,046,747 | 9/1977 | Capelle ............................. 525/429 |
| 4,117,031 | 9/1978 | Macenka et al. ................. 260/838 |

FOREIGN PATENT DOCUMENTS

| | | |
|---|---|---|
| 1086043 | 7/1960 | Fed. Rep. of Germany . |
| 2624858 | 12/1977 | Fed. Rep. of Germany . |
| 507013 | 6/1939 | United Kingdom . |
| 526877 | 9/1940 | United Kingdom . |

OTHER PUBLICATIONS

Kunststuff-Handbuch, vol. X, 1968, p. 23.

*Primary Examiner*—Theodore E. Pertilla
*Attorney, Agent, or Firm*—Oblon, Fisher, Spivak, McClelland & Maier

[57] ABSTRACT

Co-condensates are prepared by condensing from 0.8 to 2.0 moles of butyraldehyde with 1 mole of a phenol at from 80° to 220° C. with the addition, before, during or after the condensation, of from 5 to 50% by weight, based on the mixture of phenol and butyraldehyde, of one or more thermoplastics containing functional groups, which reacts with phenol, butyraldehyde or the phenol-butyraldehyde resin under the condensation conditions. The co-condensates are used as hot-melt adhesives and as binders for nonwovens.

10 Claims, No Drawings

CO-CONDENSATES BASED ON PHENOL-BUTYRALDEHYDE RESINS, THEIR PREPARATION AND THEIR USE

The present invention relates to a process for the preparation of co-condensates based on phenol-butyraldehyde resins by condensing a phenol with butyraldehyde in the presence of an acid catalyst.

Similarly to the method used to prepare phenolformaldehyde resins, phenol-butyraldehyde resins are prepared by condensing phenol with n-butyraldehyde or isobutyraldehyde. The conventional resins are used, for example, as binders in the production of wood fiberboard. It is a disadvantage of the conventional resins that, particularly when using phenol-formaldehyde resins, substantial amounts of phenol are eliminated and as a result substantially pollute the environment. In addition, the products eliminate formaldehyde, and this also detracts from their processability.

U.S. Pat. No. 2,902,458 discloses the reaction of phenol-formaldehyde resins with aqueous emulsions of polyvinyl acetate in the presence of emulsifiers. This reaction gives products which are used, for example, in the manufacture of chipboard, or as wood glues. The disadvantage of these products again manifests itself during processing, when substantial amounts of phenol and formaldehyde are eliminated.

It is an object of the present invention to provide modified phenol-butyraldehyde resins which do not eliminate phenol during processing, so that when such products are processed they cause virtually no pollution of the environment.

We have found that this object is achieved, in the process referred to at the outset, if from 0.8 to 2.0 moles of butyraldehyde are employed per mole of phenol and if before, during or after the condensation of phenol and butyraldehyde from 5 to 50% by weight, based on phenol and butyraldehyde, of a thermoplastic which contains functional groups are added and the cocondensation is carried out at from 80° to 220° C.

Phenols which may be used to prepare the phenol-butyraldehyde condensates are in particular those of the general formula

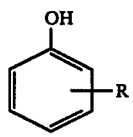

Here R is hydrogen, chlorine or bromine or alkyl of 1 to 18 carbon atoms in any isomeric form, these substituents being in the o-, m- or p-position to the hydroxyl group, or is an alicyclic group of 5 to 18 carbon atoms, eg. cyclopentyl, cyclohexyl, methylcyclohexyl or butylcyclohexyl, an aromatic group or aralkyl of 6 to 18 carbon atoms, eg. phenyl, α-methylbenzyl, benzyl or cumyl. Further, phenolic alkyl ketones, cycloalkyl ketones, aryl ketones and aralkyl ketones, and phenolic alkylcarboxylic acids, cycloalkylcarboxylic acids, arylcarboxylic acids and aralkylcarboxylic acids may be used.

Examples of suitable substituted phenols are p-tert.-butylphenol, p-sec.-butylphenol, p-tert.-hexylphenol, p-isooctylphenol, p-phenylphenol, p-benzylphenol (bisphenol A), p-cyclohexylphenol, p-decylphenol, p-dodecylphenol, p-tetradecylphenol, p-octadecylphenol, p-nonylphenol, p-methylphenol, p-β-naphthylphenol, p-α-naphthylphenol, p-pentadecylphenol, p-cetylphenol, p-cumylphenol, p-hydroxyacetophenone, p-hydroxybenzophenone, phenols alkylated with limonene or with oleic acid, and the corresponding o- and m-derivatives, eg. m-butylphenol and o-butylphenol, as well as mixtures of such phenols.

It is clear from the foregoing that virtually any phenol may be used to prepare the phenolic resins employed according to the invention, provided it possesses a position in the molecule capable of reacting in the conventional manner and permitting the formation of substituted methylene bridges, resulting in a condensation product. Pure phenols may be used, but this is not always essential. For example, it is also possible to alkylate a phenol and then react it with butyraldehyde, to give a crude product which contains condensation products of both polyalkylated and non-alkylated phenols. Mixtures of the above phenols may also be used.

Aldehydes which may be used are n-butyraldehyde and isobutyraldehyde, and mixtures of the isomeric butyraldehydes.

Acid catalysts which may be used are phosphorus trichloride, phosphorus oxychloride, phosphorus pentachloride, sulfuric acid, concentrated hydrochloric acid and aromatic sulfonic acids, eg. p-toluenesulfonic acid. The requisite amount of acid catalyst is in general less than 5, in particular from 0.1 to 1, % by weight of phenol.

Preferably, unsubstituted phenol and isobutyraldehyde are used to prepare the phenol-butyraldehyde resins, One mole of a phenol is condensed with from 0.8 to 2.0, preferably from 1.0 to 1.2, moles of isobutyraldehyde and/or n-butyraldehyde.

The phenol-butyraldehyde resins may be prepared by first introducing the phenol and the acid catalyst into the reaction vessel and adding the aldehyde continuously or in portions. The condensation is preferably carried out in the absence of a solvent. In order to ensure thorough mixing of the components from the start, the phenol is, in such cases, employed already molten, or is melted in the reaction vessel, before the isobutyraldehyde or n-butyraldehyde is added. On addition of the butyraldehyde, the reaction commences, as is discernible from a rise in temperature of the reaction mixture. The condensation of the phenol with the butyraldehyde may also be carried out by introducing the reactants simultaneously into the reactor, taking care that the reaction takes place in a controllable manner. The condensation reaction can be carried out batchwise or continuously, and can also be operated under pressure at elevated temperatures. In that case, shorter residence times are needed. The condensation temperature may be up to 200° C. However, the condensation can also be carried out under relatively mild conditions, by adding the aldehyde to the phenol, with thorough mixing, and allowing the batch to reflux. The water formed during condensation forms an azeotrope with, for example, isobutyraldehyde and can therefore easily be removed azeotropically from the system, using conventional equipment. As the condensation progresses, the temperature of the reaction mixture rises. The mixture is heated at 105° C. for from 4 to 7 hours, depending on the size of the batch. However, the condensation can also be carried out in the presence of a solvent, eg. toluene or xylene, but this entails additional costs since the solvent must subsequently be removed. The condensation reaction is continued until the n-butyraldehyde or isobutyraldehyde has been converted to condensation products. The progress of the condensation can be followed by taking a sample of the reaction mixture, removing the water from the sample and determining the softening point of the residue. The softening point of the anhydrous phenol-butyraldehyde condensate is from 80° to 120° C. (measured according to DIN 53,180).

Conventional modifiers may be used when preparing the condensation products of phenol and butyraldehydes. Such modifiers are urea, cyclic ureas, eg. ethyleneurea and propyleneurea, aminotriazines and the methylol derivatives and alkoxymethyl derivatives of the said compounds. It is also possible to introduce polycondensation products of ureas or aminotriazines from the start, or during the condensation, or during the cocondensation.

Normally the modifier in an amount of up to 0.4 mole per mole of phenol is employed in the condensation reaction.

After termination of the condensation, the phenol-butyraldehyde resin can be neutralized, using ammonia, amines or sodium hydroxide or potassium hydroxide solution. The preferred base is ammonia. Neutralizing the resin substantially avoids decomposition and side-reactions. If neutralization is carried out, the water, excess aldehyde and volatile by-products of the condensation reaction are removed; advantageously, the volatile products are distilled off under reduced pressure. The volatile products may be removed before or after the addition of a thermoplastic containing functional groups.

Thermoplastics containing functional groups are, for the purposes of the invention, all thermoplastic polymers which can react with phenol-butyraldehyde resins, with phenol or with n- or isobutyraldehyde, at up to 220° C. All thermoplastics other than polystyrene, polyethylene, polypropylene, polyisobutylene and unmodified rubbers may be used. Functional groups which may be present in the thermoplastics are for example the following: ester, amide, hydroxyl, amine, carboxyl, anhydride, SH, carbamate, isocyanate, urea, N-methylol and NH groups, and halogen atoms. The thermoplastics may be homopolymers or copolymers. Examples of suitable thermoplastics are polyvinyl acetate, polyvinyl propionate, homopolymers of esters of ethylenically unsaturated $C_3$–$C_5$-carboxylic acids, eg. methyl acrylate, butyl acrylate, 2-ethylhexyl acrylate, methyl methacrylate, butyl methacrylate, propyl crotonate, dibutyl maleate, diethyl fumarate, monomethyl maleate and monobutyl fumarate. Other particularly suitable thermoplastics are copolymers of ethylene with vinyl esters, eg. vinyl acetate, vinyl propionate and vinyl butyrate, copolymers of ethylene with esters of ethylenically unsaturated $C_3$–$C_5$-carboxylic acids, eg. butyl acrylate and butyl methacrylate, and copolymers of ethylene which in addition to the stated comonomers contain other monomers as copolymerized units, for example ethylenically unsaturated $C_3$–$C_5$-carboxylic acids, their amides, or their esters with alcohols and/or aminoalcohols. Other examples of suitable thermoplastics are polyvinyl chloride, polyvinylidene chloride, nylons, eg. polycaprolactam and condensation products of adipic acid and hexamethylenediamine, polyesters, eg. of terephthalic acid and ethylene glycol, copolymers of styrene and maleic anhydride, copolymers of styrene and maleic acid, copolymers of styrene and esters of ethylenically unsaturated $C_3$–$C_5$-carboxylic acids, condensation products of urea and formaldehyde, polyvinyl alcohol, melamine-formaldehyde resins and oxidized polyethylene wax. The functional groups must be present in the thermoplastic in an amount which makes crosslinking feasible. In most cases, a content of 0.1% by weight of functional groups already suffices to effect crosslinking during co-condensation. The minimum content of functional groups in the thermoplastic varies greatly and depends, for example, on the reactivity of the functional groups. It can easily be determined by preliminary experiments. If a homogeneous mixture is obtained after co-condensation, it means that the thermoplastic contains a sufficient amount of functional groups. By contrast, on heating phenolbutyraldehyde resins with polyethylene or polystyrene at 170°-190° C., products which demix on cooling are obtained. For example, in the case of the copolymers of ethylene and vinyl acetate and/or alkyl acrylates, the presence of 5% of vinyl acetate or alkyl acrylate units already suffices. The molecular weight of the thermoplastics can vary within wide limits and does not impose a limitation on their usefulness in the preparation of the co-condensates according to the invention. The thermoplastics may be used as solids, as a solution in an organic solvent, or as an aqueous dispersion; the latter may be a primary or secondary dispersion. The dispersions or polymer solutions may be employed directly for the preparation of the co-condensation products according to the invention, but the thermoplastics can also be isolated beforehand from the solutions or dispersions.

Because of its content of functional groups, the thermoplastic is crosslinkable with the phenol-butyraldehyde resin. According to the invention, the co-condensation of the resin with the thermoplastic may be carried out before, during or after the condensation of phenol with butyraldehyde. Preferably, the phenolbutyraldehyde resin is dehydrated and then reacted with the thermoplastic or with a mixture of thermoplastics. The reaction may be carried out batchwise or continuously, at from 80° to 250° C., preferably from 120° to 180° C. The reaction time can vary within wide limits and can be, for example, from one minute to 5 hours; it depends essentially on the reaction temperature. A reaction time exceeding 5 hours, for example heating for 10 hours at 180° C., produces no substantial change in the reaction products. The further condensation, ie. the reaction of the thermoplastic with the phenol-butyraldehyde resin, may be carried out under reduced pressure, atmospheric pressure or superatmospheric pressure, at elevated temperatures, continuously or batchwise. For the co-condensation, from 5 to 50, preferably from 10 to 25, % by weight—based on phenol and butyraldehyde—of a thermoplastic or a mixture of thermoplastics is added. This further condensation produces co-condensates which are still fusible.

If, for the further condensation, the thermoplastic is employed in the form of a solution or dispersion, the solvent or water must be removed from the system. This can be done particularly gently by azeotropic distillation, or by distilling off the volatile constituents under reduced pressure. The melting points of the co-condensates, measured according to DIN 53,180, are from 60° to 170° C. The co-condensates are comminuted in conventional equipment and preferably pulverized. They are used especially as hot-melt adhesives and have proved particularly suitable as binders for nonwovens. The co-condensates may also be used to prepare adhesive mixture, wood glues, sand core binders or tackifiers for rubber mixtures.

The co-condensates are used especially in the manufacture of insulating mats for internal fitments of automobiles. These insulating mats are obtained by laying fibers, together with co-condensate powder, on a drum or screen and then pressing these together, and converting them to moldings, whilst applying heat. The co-condensate melts and on cooling bonds the individual fibers, to form a molding. The insulating mats thus produced can vary in density depending on the degree of compression; as a rule, the density is from 20 to 100 kg/m$^3$. The insulating mats usually contain from 10 to 40% by weight of the co-condensate as a hot-melt adhesive. Because of their content of hot-melt adhesive, these mats can be directly heat-bonded to other materials, for example metals, wood, fabrics or nonwovens, or to themselves.

The Examples which follow illustrate the invention. In the Examples, parts and percentages are by weight. The melting points of the condensates were determined in accordance with DIN 53,180.

EXAMPLE 1

282 parts of phenol and 3 parts of p-toluenesulfonic acid are introduced into a flask equipped with a stirrer, condenser, thermometer and dropping funnel, and are fused at about 50° C. 238 parts of isobutyraldehydehyde are introduced into the melt over 5-8 minutes, with vigorous stirring; in the course thereof, the temperature rises to 80°-90° C. After completion of this addition, the mixture is stirred for 4 hours under reflux, during which the internal temperature gradually rises to 95°-100° C. 3.5 parts of concentrated ammonia are then added rapidly. Next the low-boiling constituents are distilled off under atmospheric pressure at up to 130° C. temperature in the flask. The distillate consists of about 25 parts of isobutyraldehyde and 40 parts of water. Per mole of phenol, the phenol-isobutyraldehyde resin contains 1 mole of isobutyraldehyde as co-condensed units. 85 parts of a copolymer consisting of 65% of ethylene units and 35% of vinyl acetate units are then added to the phenol-isobutyraldehyde resin which is at 130° C. The copolymer added has a melt index of 120 g/10 min. The reactants are mixed thoroughly and all the volatile constituents are then distilled from the reaction mixture under a pressure of 30 mbar, during the course of which the temperature of the reaction mixture is raised to 160° C. The co-condensation is complete after 30 minutes at 160° C. 510 parts of a pale brown resin, which has a softening point of 95°-105° C., are obtained. This resin is ground to a powder and is used, in this form, as a binder for nonwovens.

For the last-mentioned operation, 100 parts of regenerated cellulose fibers (preferably natural fibers containing small proportions of synthetic polyester or nylon fibers) are mixed with 30 parts of the above co-condensate powder in an air stream and are used to lay a web on a pneumatic unit. This web is then pressed at about 200° C. between heated perforated metal belts to give a sheet having a density of about 30-40 kg/m$^3$. The gases evolved do not contain any constituents which pollute the environment. The bonded web can be re-heated and pressed to form moldings, for example padding and insulating material for the automotive industry.

The moldings produced with the co-condensate according to the invention conform to all the quality requirements which products have to meet for use in the automotive industry. Their non-flammability conforms to U.S. Specification FNVSS No. 302.

EXAMPLE 2

282 parts of phenol and 3 parts of p-toluenesulfonic acid are mixed, and fused at about 50° C., in a flask of the type described in Example 1. 47 parts of a copolymer consisting of 65% of ethylene units and 35% of vinyl acetate units and having a melt index of 120 g/10 min are introduced into the melt and 238 parts of isobutyraldehyde are then added dropwise in the course of about 5 minutes. The temperature of the reaction mixture rises to about 80° C. When all has been added, the mixture is stirred for 4 hours under reflux, during which the internal temperature rises to 95° C. 3.5 parts of concentrated ammonia are then added rapidly and next the low-boiling constituents are distilled off under atmospheric pressure until the temperature in the flask reaches about 130° C. The distillate consists of 27 parts of isobutyraldehyde and 39 parts of water. The pressure is then cautiously reduced, all the volatile constituents are distilled off at about 20 mbar, and the temperature of the reaction mixture is raised to 160° C. under this pressure. The residue obtained consists of 452 parts of a pale brown co-condensate which has a softening point of 98° C. It is used as a hot-melt adhesive for bonding glass fiber mats to metal (sheet iron) and as a binder for nonwovens.

EXAMPLE 3

282 parts of phenol and 3 parts of p-toluenesulfonic acid are melted at 50° C. in a flask of the type described in Example 1 and 238 parts of isobutyraldehyde are added in the course of 5-8 minutes, whereupon the temperature rises to 80°-90° C. After completion of the isobutyraldehyde addition, the mixture is stirred for 4 hours under reflux, during which the internal temperature rises to 95°-100° C. 3.5 parts of concentrated (25% strength) ammonia are then added rapidly and next the low-boiling constituents are distilled off under atmospheric pressure until the temperature in the flask reaches 130° C. The distillate consists of 26 parts of isobutyraldehyde and 41 parts of water. Per mole of phenol, the phenol-isobutyraldehyde resin contains 1 mole of isobutyraldehyde as condensed units. After adding 85 parts of a copolymer consisting of 60% of ethylene units and 40% of vinyl acetate units and having a melt index of 18 g/10 min, the pressure is reduced and all the volatile constituents are distilled from the reaction mixture at 20-30 mbar until the temperature in the flask reaches 160° C. The co-condensation is complete within 30 minutes at 160° C.

The residue obtained consists of about 500 parts of a pale brown co-condensate which has a softening point of 95°-100° C. The co-condensate is comminuted and is used, in the form of a powder, as a binder for mineral fiber nonwovens.

EXAMPLE 4

282 parts of phenol and 3 parts of p-toluenesulfonic acid are first introduced into a stirred flask of the type described in Example 1, and 238 parts of isobutyraldehyde are added at 50° C. in the course of about 8 minutes, whereupon the temperature rises to 80°-90° C. The mixture is then refluxed for 4 hours, during which the internal temperature rises to 95°-100° C. After the end of the reflux period, 3.5 parts of concentrated (25% strength) ammonia are added rapidly and next the low-boiling constituents are distilled off under atmospheric pressure until the temperature in the flask reaches about 130° C. Per mole of phenol, the phenolisobutyraldehyde resin contains 1 mole of isobutyraldehyde as condensed units. 100 parts of polycaprolactam are then added to the contents of the flask, reduced pressure is cautiously applied and all the volatile constituents are distilled off under 20 mbar, whilst raising the reaction mixture to 210° C. The mixture is then kept at this temperature for 1 hour.

The residue left consists of 498 g of a brown co-condensate having a softening point of 96° C. It is used as a binder for polyester or nylon nonwovens.

EXAMPLE 5

282 parts of phenol and 3 parts of p-toluenesulfonic acid are first introduced into a stirred flask of the type described in Example 1, and 238 parts of isobutyraldehyde are added at 50° C. in the course of about 8 minutes, whereupon the temperature rises to 80°–90° C. The mixture is then refluxed for 4 hours, during which the internal temperature gradually rises to 95°–100° C. After the end of the reflux period, 3.5 parts of concentrated ammonia are added rapidly and the low-boiling constituents are distilled off under atmospheric pressure until the temperature in the flask reaches about 130° C. Per mole of phenol, the phenol-isobutyraldehyde resin contains 1 mole of isobutyraldehyde as condensed units. After adding 85 parts of a condensation product of adipic acid and hexamethylenediamine, reduced pressure is applied cautiously and all the volatile constituents are distilled off at 20–30 mbar until the temperature reaches 220° C., after which it is maintained at this level for 2 hours.

The residue obtained consists of 496 parts of a dark co-condensate which has a softening point of 103° C. It is used as a binder for glass fiber mats.

EXAMPLE 6

300 parts of a p-octylphenol-isobutyraldehyde resin which has been obtained by condensing p-octylphenol with isobutyraldehyde in the molar ratio of 1:1.2 in an acid medium are melted at 140° C. in a flask equipped with a stirrer, condenser and thermometer, and 60 parts of a copolymer consisting of 65% of ethylene units and 35% of vinyl acetate units are added. The melt is heated to 160° C. and is stirred at this temperature for 2 hours. The resin is poured out whilst still hot and is comminuted after it has cooled.

340 parts of a brown co-condensate having a softening point of 82° C. are obtained. This is pulverized and mixed with wood chips in the weight ratio of 1:0.2. The mixture is pressed at 180° C. to form panels.

EXAMPLE 7

282 parts of phenol and 3 parts of p-toluenesulfonic acid are melted at 50° C. in a flask of the type described in Example 1 and 238 parts of isobutyraldehyde are added in the course of 5–8 minutes, whereupon the temperature rises to 80°–90° C. After completion of the isobutyraldehyde addition, the mixture is refluxed for 4 hours, during which the internal temperature rises to 95°–100° C. 3.5 parts of concentrated ammonia are then added rapidly and next the low-boiling constituents are distilled off under atmospheric pressure until the temperature in the flask reaches 130° C. Per mole of phenol, the phenol-isobutyraldehyde resin contains 1 mole of isobutyraldehyde as condensed units. After adding 85 parts of polyvinyl chloride, the pressure is reduced and the volatile constituents are distilled off at 20–30 mbar until the temperature in the flask reaches 160° C. The temperature is then kept at 160° C. for a further 30 minutes. The residue consists of 481 parts of a brown co-condensate having a softening point of 92°–94° C. It is used as a binder for cellulose fiber webs.

EXAMPLE 8

282 parts of phenol and 3 parts of p-toluenesulfonic acid are first introduced into a stirred flask of the type described in Example 1, and 238 parts of isobutyraldehyde are added at 50° C. in the course of 10 minutes, whereupon the temperature rises to 80°–90° C. The reaction mixture is then refluxed for 4 hours, during which the internal temperature rises to 95°–100° C. After the end of the reflux period, 3.5 parts of concentrated ammonia are added rapidly and the low-boiling constituents are distilled off under atmospheric pressure until the temperature in the flask reaches about 130° C. Per mole of phenol, the phenol-isobutyldehyde resin contains 1 mole of isobutyraldehyde as condensed units. 85 parts of a polyester of adipic acid and glycol are then added, reduced pressure is cautiously applied and all the volatile constituents are distilled off under 20 mbar until the temperature in the flask reaches 160° C. The co-condensation is complete within 20 minutes at 160° C.

462 parts of a pale brown co-condensate having a softening point of 80° C. are obtained. This is used as a binder for nylon, polyacrylic or polyester fiber webs.

EXAMPLE 9

282 parts of phenol and 3 parts of p-toluenesulfonic acid are introduced into a flask of the type described in Example 1 and 238 parts of isobutyraldehyde are added at 50° C. in the course of about 10 minutes. Hereupon the temperature rises to about 90° C. After completion of the isobutyraldehyde addition, the mixture is refluxed for 4 hours, during which the internal temperaure rises to 95°–100° C. 3.5 parts of concentrated ammonia are then added rapidly and next the low-boiling constituents are distilled off under atmospheric pressure until the temperature in the flask reaches about 130° C. Per mole of phenol, the phenol-isobutyraldehyde resin contains 1 mole of isobutyraldehyde as condensed units. 100 parts of a commercial soft resin based on urea-formaldehyde are then added, reduced pressure is cautiously applied and all the volatile constituents are distilled off at 20 mm Hg until the temperature reaches 160° C. The co-condensation has ended after 10 minutes at 160° C. The co-condensate which remains (440 parts) has a softening point of 128° C. It is used as a binder for cellulose fiber webs.

EXAMPLE 10

282 parts of phenol and 3 parts of p-toluenesulfonic acid are introduced into a flask of the type described in Example 1 and 238 parts of n-butyraldehyde are added at 50°–60° C. in the course of about 10 minutes. Hereupon, the temperature rises to 80° C. After all has been added, the mixture is stirred under reflux for 4 hours, during which the internal temperature gradually rises to 102° C. 3.5 parts of concentrated ammonia are then added rapidly and next the low-boiling constituents are distilled off under atmospheric pressure until the temperature in the flask reaches about 130° C. Per mole of phenol, the phenol-butyraldehyde resin contains 1mole of n-butyraldehyde as condensed units. After adding 85 parts of a copolymer consisting of 65% of ethylene units and 35% of vinyl acetate units, reduced pressure is applied and the volatile constituents are distilled off at 20–30 mbar until the temperature in the flask reaches 160° C. The co-condensation is complete after 30 minutes at 160° C.

462 parts of a dark brown co-condensate having a softening point of 60° C. are obtained. If the co-condensation is carried out for 6 hours at 160° C., a co-condensate having a softening point of 62° C. is obtained. The co-condensate is used as a binder for nonwovens of polyvinyl chloride fibers.

EXAMPLE 11

282 parts of phenol and 3 parts of p-toluenesulfonic acid are introduced into a flask of the type described in Example 1 and 238 parts of isobutyraldehyde are added at 50° C. in the course of 10 minutes. Hereupon the temperature rises to about 90° C. After completion of the isobutyraldehyde addition, the reaction mixture is refluxed for 4 hours, during which the internal temperature gradually rises to 95°–100° C. 20 parts of urea are then added and refluxing is continued for 2 hours. After adding 3.5 parts of concentrated ammonia, all the volatile constituents are distilled off, first under atmospheric pressure up to 130° C., and then under reduced pressure, at 20–30 mbar, up to 160° C. Per mole of phenol, the phenol-isobutyraldehyde resin contains 1 mole of isobutyraldehyde as condensed units.

The urea-modified phenol-isobutyraldehyde resin is then co-condensed for 30 minutes at 160° C. with 85 parts of a copolymer consisting of 65% of ethylene units and 35% of vinyl acetate units.

The residue consists of 435 parts of a pale brown co-condensate having a softening point of 96° C. It is used as a binder for cellulose fiber nonwovens.

EXAMPLE 12

640 parts of xylene, 400 parts of a phenolisobutyraldehyde resin obtained by condensing phenol with isobutyraldehyde in the molar ratio of 1:1.1 in the presence of hydrochloric acid, and 160 parts of a 50% strength aqueous dispersion of a vinyl propionate/methyl acrylate copolymer are introduced into a flask equipped with a stirrer, condenser, thermometer and water separator, and are brought to the reflux temperature. The mixture is stirred under reflux for 4 hours, whilst removing the water from the polymer dispersion via the water separator. Xylene and low-boiling constituents are then distilled off under reduced pressure until the temperature in the flask reaches 180° C. The co-condensate which remains (470 parts) has a softening point of 135° C. It is soluble in tetrahydrofuran and can be used, as a solution, for the production of thin films of hot-melt adhesive, which become tacky on heating.

The co-condensate can also be employed in the form of a powder as a binder for nonwovens.

EXAMPLE 13

400 parts of a phenol-isobutyraldehyde resin obtained by condensing phenol with isobutyraldehyde in the presence of phosphorus oxychloride in the molar ratio of 1:1.1 are melted at 140° C. in a flask equipped with a stirrer, condenser and thermometer, and 80 parts of a copolymer of 70% of styrene, 20% of isobutyl acrylate and 10% of monobutyl maleate are added. The mixture is heated to 180° C. and is stirred at this temperature for 30 minutes. The co-condensate is poured out whilst still hot and is comminuted after it has cooled. 472 parts of a pale brown co-condensate having a softening point of 118° C. are obtained. This is used as a binder for regenerated fiber nonwovens.

EXAMPLE 14

Webs are laid by the method described in Example 1 from 100 parts of regenerated cellulose fibers and 30 parts of the co-condensate described in Example 1, and are then pressed to form moldings. The phenol content of the gases generated during pressing is determined and found to be 0.01%.

COMPARATIVE EXAMPLE

Example 14 is repeated with the difference that instead of a co-condensate according to the invention 30 parts of a phenol-formaldehyde resin (softening range 98°–100° C.) are employed. The phenol content of the gas generated whilst pressing moldings is determined and is found to be 3%.

We claim:

1. A process for the preparation of a co-condensation product based on a phenol and butyraldehyde, comprising:
    condensing a butyraldehyde with a phenolic compound in a mole ratio of 0.8 to 2.0 moles aldehyde per mole of phenolic compound and adding to said reactants before, during or after condensation from 5 to 50% by weight, based on the mixture of phenol and butyraldehyde, of a thermoplastic which can react with said phenol-butyraldehyde co-condensation product containing functional groups selected from the group consisting of ester, amide, hydroxyl, amine, carboxyl, anhydride, SH, carbamate, isocyanate, urea, N-methylol, NH groups and halogen atoms, the co-condensation reactions with said thermoplastic being conducted at a temperature of 80° to 220° C.

2. The process as claimed in claim 1, wherein phenol and isobutyraldehyde are employed.

3. The process as claimed in claim 1 or 2, wherein the thermoplastic containing functional groups is added from after completion of the condensation of a phenol with butyraldehyde.

4. The process of claim 3, wherein said phenol-butyraldehyde condensation product is prepared by condensing said phenol and said butyraldehyde in the presence of an acid catalyst and then neutralizing said condensation product with base prior to co-condensation of said condensation product with said thermoplastic.

5. The process as claimed in claim 1, wherein from 10 to 25% by weight of a thermoplastic containing functional groups are added for the co-condensation.

6. The process as claimed in claim 1, wherein, when condensing a phenol with butyraldehyde, up to 0.4 mole, per mole of phenol, of urea, a cyclic urea or an aminotriazine and/or a methylol or alkoxymethyl derivative thereof is used as a modifier.

7. The co-condensate obtained by the process as claimed in claim 1.

8. The process of claim 1, wherein said phenol has the formula:

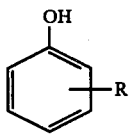

wherein R is hydrogen, chlorine, bromine, alkyl of 1 to 18 carbon atoms in any isomeric form, an alicyclic group of 5 to 18 carbon atoms, or an aromatic group or aralkyl group of 6 to 18 carbon atoms, said substituent R being substituted in the o, m, or p position relative to the hydroxyl group.

9. The process of claim 1, wherein said thermoplastic is polyvinyl acetate, polyvinyl propionate, homopolymers of esters of ethylenically unsaturated $C_3$–$C_5$ carboxylic acids, copolymers of ethylene with vinyl esters, copolymers of ethylene with esters of ethylenically $C_3$–$C_5$ carboxylic acids, copolymers of ethylene which in addition to said vinyl ester or ester of an ethylenically unsaturated $C_3$–$C_5$ carboxylic acid contain another monomer as a copolymerized unit, polyvinyl chloride, polyvinylidene chloride, a nylon, a polyester, copolymers of styrene and maleic anhydride, copolymers of styrene and maleic acid, copolymers of styrene and esters of ethylenically unsaturated $C_3$–$C_5$ carboxylic acids, condensation products of urea and formaldehyde, polyvinyl alcohol, melamine-formaldehyde resins or oxidized polyethylene wax.

10. A process for the preparation of a co-condensation product based on a phenol and butyraldehyde, comprising:

condensing a butyraldehyde with a phenolic compound in a mole ratio of 0.8 to 2.0 moles aldehyde per mole of phenolic compound and adding to said reactants before, during or after condensation from 5 to 25% by weight, based on the mixture of phenol and butyraldehyde, of a thermoplastic which can react with said phenol-butyraldehyde co-condensation product containing functional groups selected from the group consisting of ester, amide, hydroxyl, amine, carboxyl, anhydride, urea, N-methylol and halogen atoms, the co-condensation reaction with said thermoplastic being conducted at a temperature of 80° to 220° C.

* * * * *